July 30, 1929.  W. E. THOMASSON  1,722,509
BRAKE MEANS FOR AEROPLANES
Filed Nov. 18, 1927    5 Sheets-Sheet 3
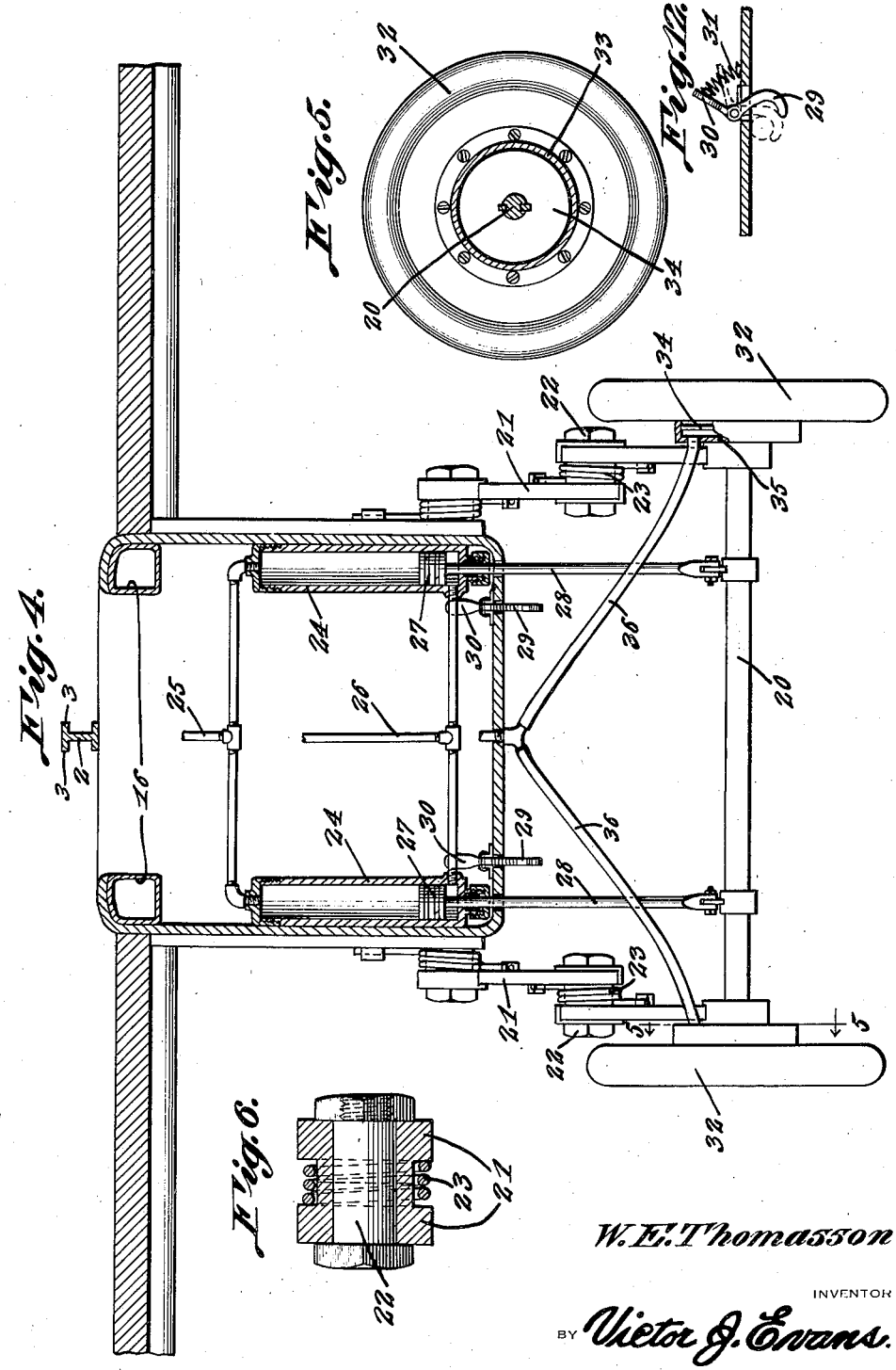

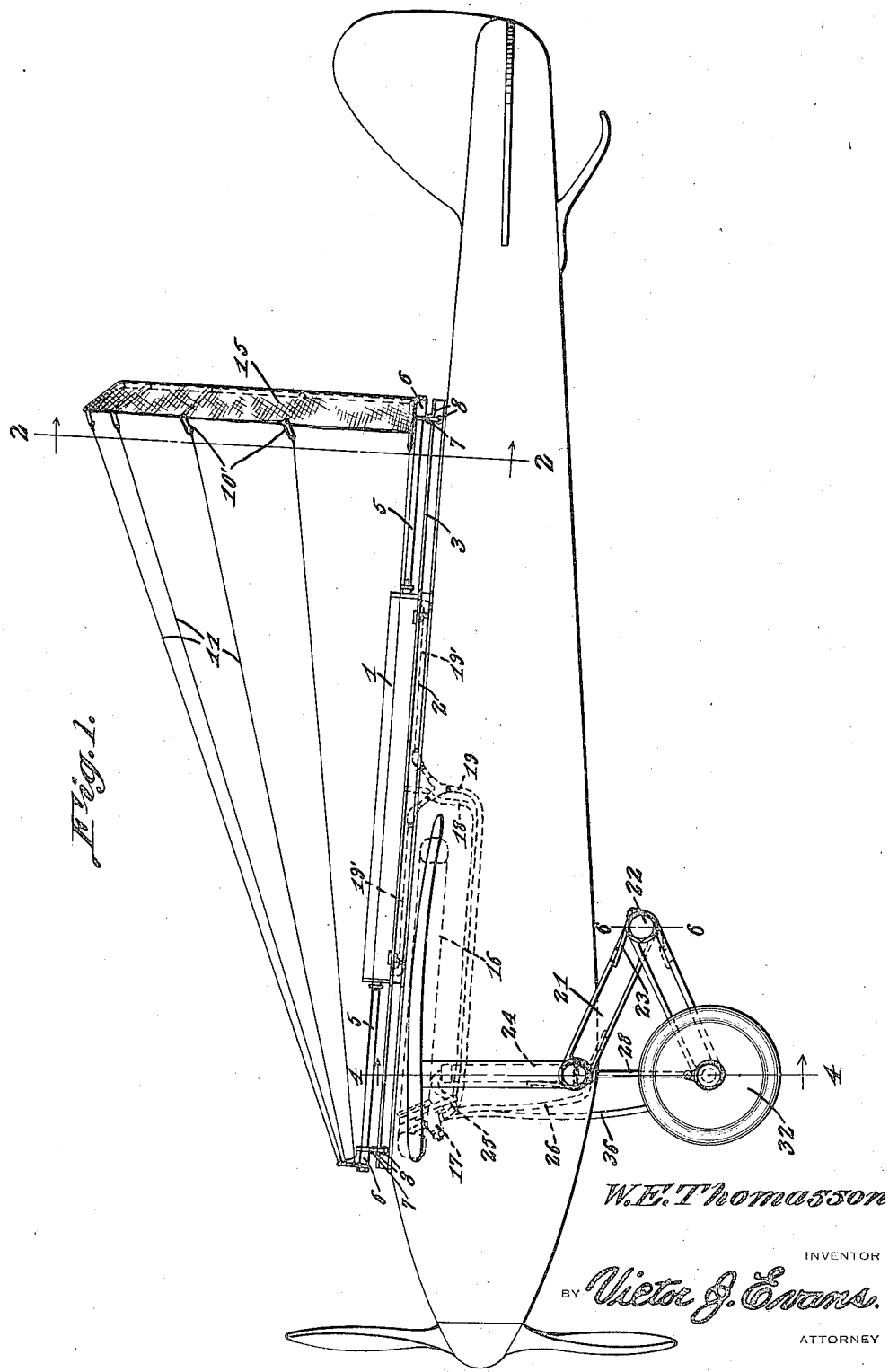

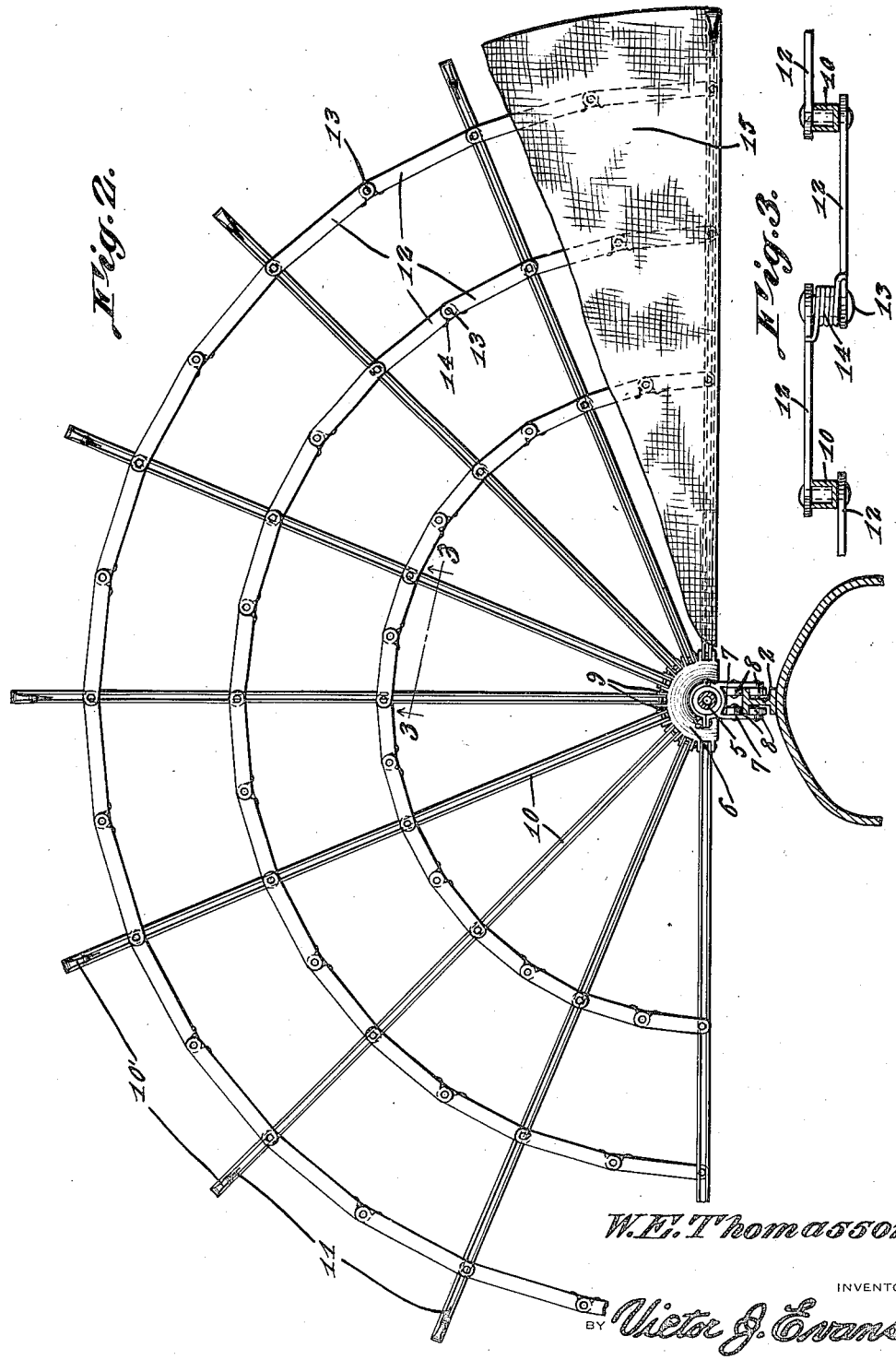

July 30, 1929.  W. E. THOMASSON  1,722,509
BRAKE MEANS FOR AEROPLANES
Filed Nov. 18, 1927   5 Sheets-Sheet 4

W. E. Thomasson
INVENTOR

BY Victor J. Evans
ATTORNEY

July 30, 1929. W. E. THOMASSON 1,722,509
BRAKE MEANS FOR AEROPLANES
Filed Nov. 18, 1927 5 Sheets-Sheet 5
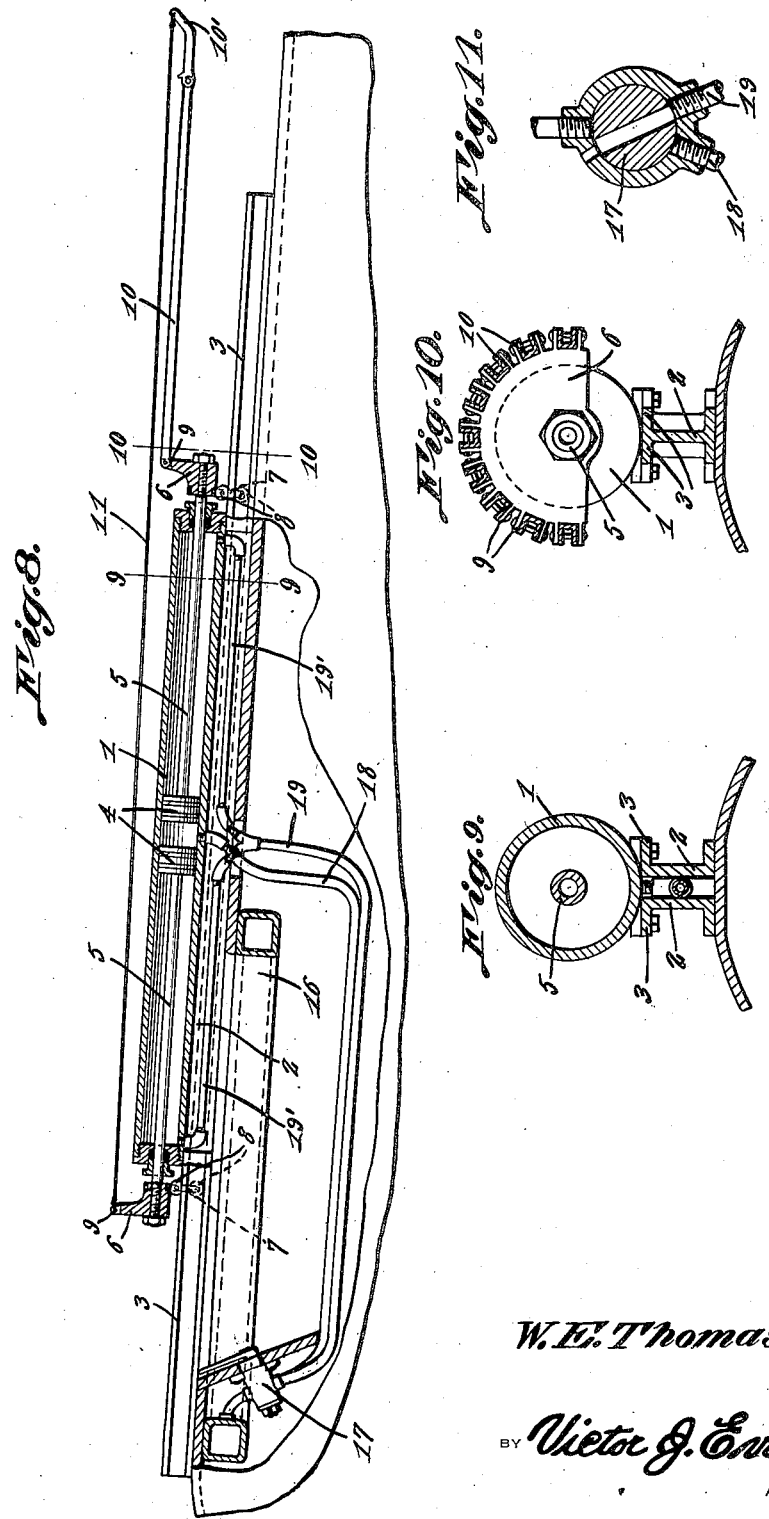
W. E. Thomasson
INVENTOR
BY Victor J. Evans
ATTORNEY

Patented July 30, 1929.

1,722,509

UNITED STATES PATENT OFFICE.

WILLIAM E. THOMASSON, OF PARSONS, KANSAS.

BRAKE MEANS FOR AEROPLANES.

Application filed November 18, 1927. Serial No. 234,317.

This invention relates to braking means for aeroplanes, the general object of the invention being to provide means for checking the speed of the machine as it lands, thus making landings more easy.

Another object of the invention is to provide a collapsible device made in the form of a fan, with power means for raising it at the top of the fuselage so that it will act against the air as the machine is landing and thus check the movement of the machine, with means associated with the wheels of the machine for setting up a braking effect on said wheels as the machine lands so that the two sets of braking means will stop the machine soon after it lands.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view showing an aeroplane constructed in accordance with this invention.

Figure 2 is a section on line 2—2 of Figure 1.

Figure 3 is a section on line 3—3 of Figure 2.

Figure 4 is a section on line 4—4 of Figure 1.

Figure 5 is a section on line 5—5 of Figure 4.

Figure 7:
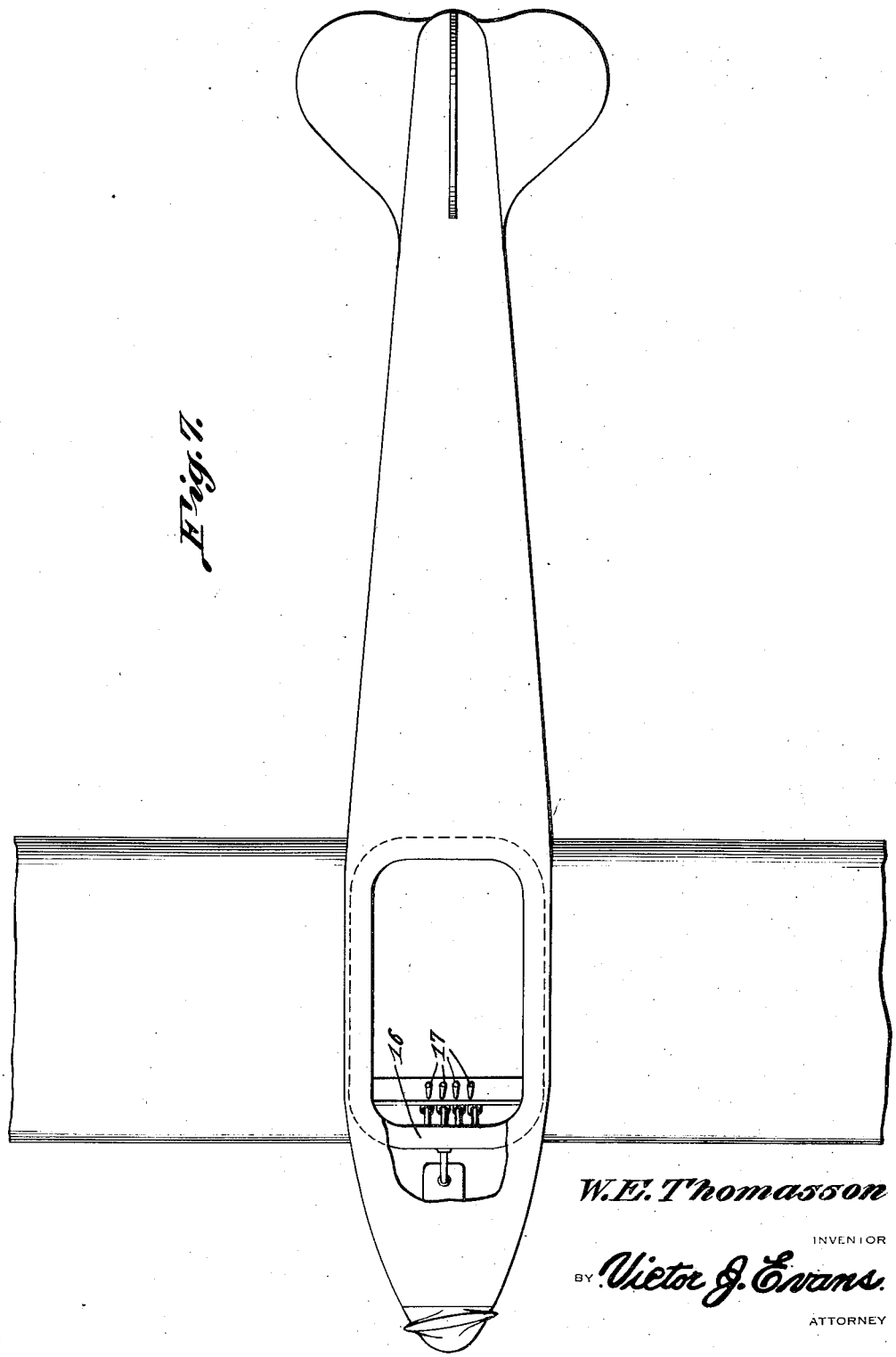

Figure 6 is a section on line 6—6 of Figure 1.

Figure 7 is a top plan view with parts omitted.

Figure 8 is an enlarged longitudinal sectional view through the operating means for the fan brake and showing the brake in inoperative position.

Figure 9 is a section on line 9—9 of Figure 8.

Figure 10 is a section on line 10—10 of Figure 8.

Figure 11 is a section on line 11—11 of Figure 8.

Figure 12 is a detail of the axle retaining means.

In carrying out my invention, I place a cylinder 1 on the top of the fuselage of the plane, said cylinder being supported by the two channel shaped members 2 which are spaced apart, as shown in Figure 9. A pair of channel shaped track forming rails 3 is placed on the top of the fuselage, one at each end of the supporting beams 2. A pair of pistons 4 is arranged in the cylinder and the rods 8 of these pistons pass through the ends of the cylinder, and the outer end of each rod has attached thereto a semi-circular member 6 which has a hanger 7 thereon carrying the wheels 8 which engage the track 3. Each member 6 has upon its curved edge a plurality of ears 9 and a plurality of fan bars 10 are pivoted to the rear member 6, one between each pair of ears thereon. These bars are provided with forwardly bent extremities 10′ and wires 11 connect these bent extremities of the fan bars with the front member 6. The fan bars are connected together by the links 12, each set of links between each pair of bars being composed of two links which have their outer ends pivoted to the bars and their inner ends pivoted together by the pivot pin 13 on which is placed a coil spring 14, with its ends engaging the links, this spring tending to move the links to closed position as shown in Figures 2 and 3. This arrangement of bars and links is provided with a covering 15 of silk or any other suitable material.

Thus it will be seen that when the pistons in the cylinders are forced apart by the introduction into the cylinders between the pistons of a suitable fluid, the piston rods will move the members 6 in opposite directions and thus the fan-shaped member will be raised and will be braced in this position by the wires 11. As the fan bars move upwardly, they will naturally spread apart, which action is resisted by the springs 14 on the links. This will stretch the covering and thus the raised fan-shaped member will catch the air and thus check the movement of the flying machine, it being understood that the device is used for checking the movement of the machine after it has made a landing.

A tank 16 is arranged in the fuselage and is supplied with compressed air or the like from any suitable source. A valve 17, arranged on the instrument board, is connected with said tank and a pipe 18 connects one of the ports of this valve with the central part of the cylinder and a pipe 19 is connected with another port of this valve and has its branched ends 19' connected with the ends of the cylinder. Thus by placing the valve handle in a certain position, air will pass into the center of the cylinder to force the pistons apart and when this is done, the pipe 19 is open to the atmosphere so that the air can escape in front of the pistons. By placing the valve in another position, air will flow from the tank through the pipe 19 to the ends of the cylinder and open the pipe 18 to the atmosphere. This will return the parts to normal position with the fan in lowered position.

The wheel carrying axle 20 is connected with a part of the fuselage by the two sets of links 21, one link of each set being pivoted to the fuselage and the other link being fastened to the axle. The two links of each set are pivotally connected together, as shown at 22, and springs 23 are placed at the pivotal points for resisting the movement of the links toward each other.

A pair of cylinders 24 is arranged in the fuselage and the upper and lower ends of these cylinders are connected by the pipes 25 and 26 with the valve means 17 on the instrument board so that air can be directed into the upper or lower ends of these cylinders to move the pistons 27 therein in one direction or the other. The piston rods 28 are connected with the axle 20 so that by moving the pistons upwardly, the wheel carrying axle is raised to a position where it will be engaged by the hooks 29 which act to hold the axle in raised position. The hooks are provided with pedals 30 so that they can be moved against the action of the springs 31.

Each wheel 32 is provided with a casing 33 containing a coil spring 34 which is connected and disconnected with a part of the wheel by the clutch means 35 which are controlled by compressed air passing through the pipes 36 which are connected with the valve means 17.

The spring connecting means between the wheels and the body act to absorb shock of landing, and such means also act to set up a braking action as the wheels run along the ground. The springs 34, when connected with the wheels by the clutch means, also set up a braking action on the wheels as the springs wind up due to the rotation of the wheels. The wheels can be drawn up close to the body after the machine has taken off and they will be held in this position by the hooks.

Instead of using silk for covering the fan, strips of aluminum or the like can be used, the strips being hingedly connected together by double action hinges, such as are used on pianos.

It is thought from the foregoing description that the advantages and novel features of my invention will be readily apparent.

It is to be understood that I may make changes in the construction and in the combination and arrangement of the several parts, provided that such changes fall within the scope of the appended claims.

What I claim is:—

1. In an aeroplane, a semi-circular member attached to the top thereof, fan bars pivotally connected with the curved edge of said member, links for connecting the bars together, each set of links being composed of two sections pivoted to a pair of bars and having their adjacent ends pivoted together, springs for moving the links to open position, a foldable cover connected with the bars and means for raising and lowering the bars.

2. In an aeroplane, a track on the top thereof, a pair of semi-circular members, wheels thereon engaging the track, a fan-like member carried by the rear semi-circular member, brace wires connected with the outer ends of the fan bars by said member and with the front semi-circular member and means for moving the semi-circular members apart to raise the fan-like member or for moving them toward each other to lower said member.

3. In an aeroplane, a track on the top thereof, a pair of semi-circular members, wheels thereon engaging the track, a fan-like member carried by the rear semi-circular member, brace wires connected with the outer ends of the fan bars by said member and with the front semi-circular member, means for moving the semi-circular members apart to raise the fan-like member or for moving them toward each other to lower said member, such means comprising a cylinder, a pair of pistons therein and piston rods connected with the pistons and passing through the ends of the cylinder and connected with the semi-circular members and means for introducing compressed fluid into the central or end portions of the cylinder to move the pistons away from each other or toward each other.

In testimony whereof I affix my signature.

WILLIAM E. THOMASSON.